350-6.8 SR

XR 3,928,759

[11] 3,928,759

[45] Dec. 23, 1975

~~TX3825D~~

TX3058D

U

Sa

[5

READING DIGITALLY ENCODED TICKETS

[75] Inventor: Ronald P. Sansone, Floral Park, N.Y.

[73] Assignee: Pitney-Bowes, Inc., Stamford, Conn.

[22] Filed: Aug. 22, 1974

[21] Appl. No.: 499,463

[52] U.S. Cl. .......... 250/568; 235/61.11 E; 250/216; 250/236; 250/566; 350/6

[51] Int. Cl.² .......... G06K 7/14

[58] Field of Search .......... 250/556, 566, 568, 569, 250/216, 235, 236; 350/6; 235/61.11 E; 340/146.3 Z, 146.3 AH

[56] References Cited

UNITED STATES PATENTS

| | | | |
|---|---|---|---|
| 3,758,753 | 9/1973 | Myer | 235/61.11 E |
| ...91 | 10/1973 | Fournier et al. | 350/6 |
| ...26 | 7/1974 | Plockl | 250/568 |

*Primary Examiner*—James W. Lawrence
*Assistant Examiner*—E. R. LaRoche
*Attorney, Agent, or Firm*—William D. Soltow, Jr.; Albert W. Scribner; Peter Vrahotes

[57] ABSTRACT

Apparatus for producing a scan pattern for the omnidirectional reading of bar code indicia. The scan pattern defines a first longitudinally extending line and a set of lines set at an angle of approximately 90° relative to the first line to yield a comb-like pattern. This optical scanning pattern assures readability of a bar code bearing indicia regardless of the angle at which the indicia is conveyed past a reader.

8 Claims, 4 Drawing Figures

3928759

OR IN 250/568

OMNIDIRECTIONAL SCANNER FOR READING DIGITALLY ENCODED TICKETS

BACKGROUND OF THE INVENTION

Many systems have been proposed in the point-of-sale field for the obtaining of information from data coded indicia, such as tags, labels, tickets and the like, having a bar code printed thereon. Recently, the grocery industry has adopted a uniform product code (UPC) which is in the form of a bar code. Systems using a hand-held wand are capable of readily reading such a bar code and thereby present no problem as the operator may pass the wand over the bar code along the length of the indicia. Where a stationary reader is employed, however, certain assurances must be made that the bar code will be read no matter what angle the indicia may assume.

Various schemes have been proposed for patterns which would assure reading of a bar code regardless of the angle of the indicia. One of these is an X-scan pattern wherein moving traces continually define an X pattern within a given field. This X-scan pattern is normally established by a mechanical means, but the reading of information from the X-scan pattern has proven to be somewhat cumbersome to the operator. The main disadvantage of such prior X-scan patterns is that they provide a square configuration which requires an extended reach by an operator when he wishes to lift an item from the conveyor at the extreme lateral edge of the conveying path. A system is herein disclosed which improves the original X-scan pattern by providing a first longitudinal scan and a plurality of scans set generally normal to the first scan to define a comb-like scan pattern.

SUMMARY OF THE INVENTION

This invention concerns the forming of a scan pattern for the omnidirectional reading of bar code bearing indicia, such as UPC bearing indicia, which are to be read at a point of sale location. The scan pattern is generated by the linear displacements of two beams of light. These linear displacements are produced by rotating and/or oscillating single and multi-faceted mirrors.

In a preferred embodiment, the scan pattern consists of a first longitudinally extending line scan and a plurality of line scans which are generally perpendicular to the longitudinally extending line scan. This scan pattern yields a comb-like appearing scan pattern.

DESCRIPTION OF THE PREFERRED EMBODIMENT

Figure 1:
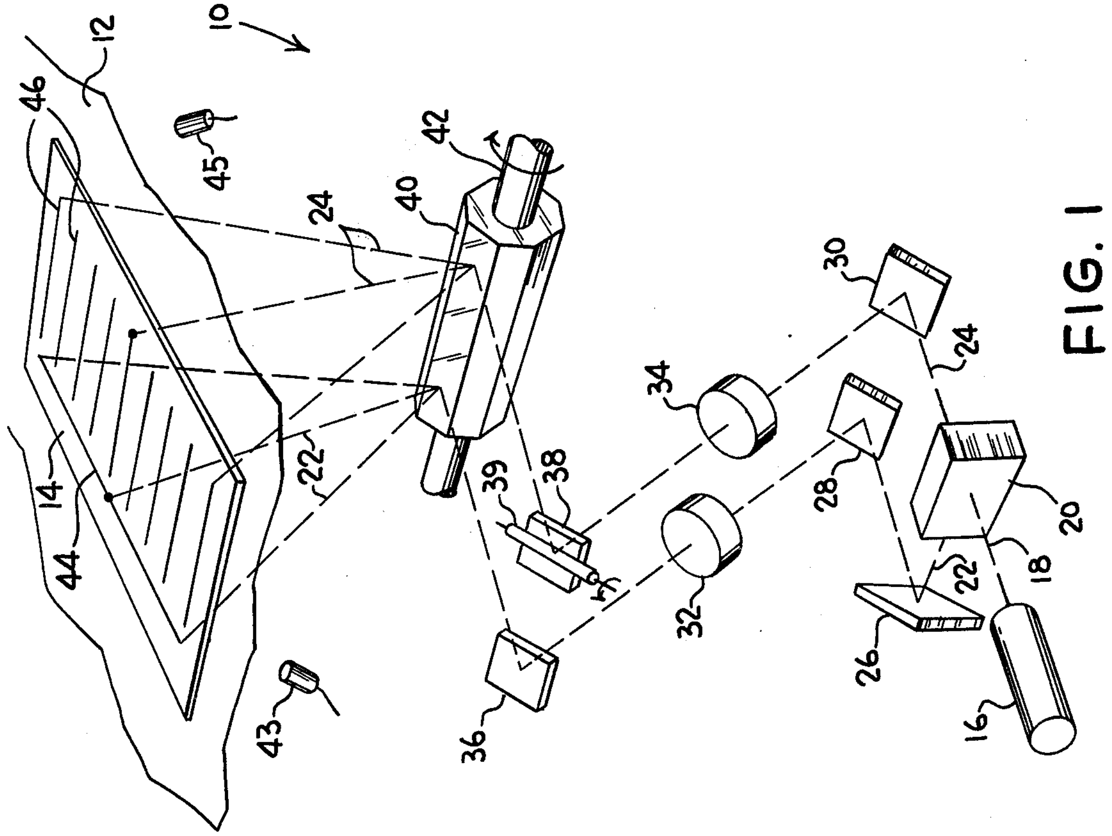
FIG. 1 is a perspective view of an apparatus which incorporates the features of this invention.

Referring now in FIG. 1 of the drawings, a scanning system for the reading of bar codes is shown generally at 10. The system 10 is located below a counter 12 of a check-out stand which has a reading area in the form of a transparent window 14, across which an article having a bar code bearing indicia may be conveyed.

A laser 16 generates a light beam 18 which is directed towards a beam splitter 20. The beam splitter 20 separates the light beam 18 into a pair of beams, one split beam 22 being reflected from the beam splitter and the second split beam 24 passing therethrough in a continuous path. It will be appreciated that a pair of lasers 16 may be used to produce a pair of light beams; however, use of the beam splitter 20 is significantly more economical. A fixed mirror 26 is located in the path of the first split beam 22 and reflects the same into a path which is parallel with the second split beam 24. The two beams 22, 24 are directed upon a pair of fixed mirrors 28, 30 respectively, from which each beam is reflected through a pair of spot forming lenses 32, 34, respectively. After the beams pass through the spot forming lenses 32, 34, the first beam 22 is directed towards another fixed mirror 36 and the second beam 24 is directed toward a mirror 38 which is secured to a rotatable shaft 39. The beams 22, 24 are reflected from the mirrors 36, 38, respectively, onto a multifaceted mirror 40 which is secured to a rotatable shaft 42.

Spaced relative to the window 14 are a detector 43 and a photocell 45 each of which is operatively connected with the associated system electronics (not shown). The detector 43 senses the presence of an item to be scanned and the photocell 45 receives reflected light.

Figure 2:
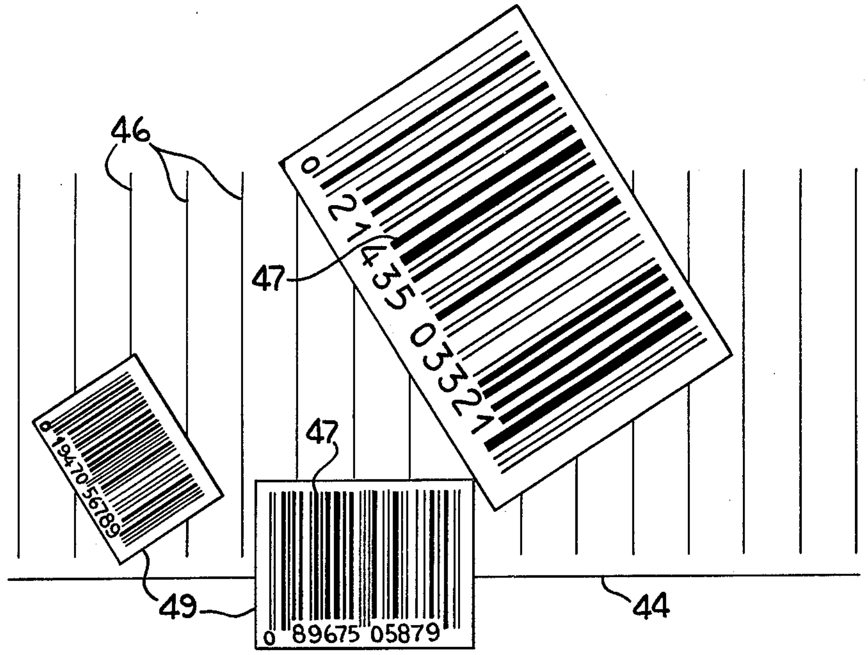
FIG. 2 is a plan view of the scan pattern produced by the apparatus of FIG. 1 shown in a plurality of code bearing indicia of various sizes.

FIG. 2 shows the scan produced by the apparatus of FIG. 1 in greater detail with a plurality of different size bar code 47 bearing labels 49 shown therewith. As can be seen from this figure, the comb-like scan pattern is able to read the bar code regardless of the orientation of the label 49.

In operation, the laser 16 is actuated to emit a beam 18 which is split into two beams 22, 24 by the beam splitter 20. Split beam 22 is directed to mirror 26 and is reflected into a parallel path with beam 24. These two beams 22, 24 are then directed to fixed mirrors 28 and 30 which direct the beams through spot forming lenses 32, 34 respectively. The spot forming lenses 32, 34 reduce the diameter of the beams 28, 30, respectively, for greater resolution and intensity. The split beams 22, 24 exit from the spot forming lenses 32, 34 as a pair of spot beams which are directed onto the fixed mirror 36 and the rotating mirror 38 respectively. The rotation of mirror 38 is accomplished by rotation as shown in the drawing. The multi-faceted mirror 40 is rotated by rotating the shaft 42. As the beam 22 is reflected from the fixed mirror 36 onto the rotating multi-faceted mirror 40, it is reflected to form a longitudinally extending scan line 44 at the window 14. Simultaneously, beam 24 is reflected from the rotating mirror 38 onto the multi-faceted mirror 40. It will be appreciated that the scan ~~24 is reflected upon~~ the multi-faceted mirror less than 50% of the time. As the mirror 38 is rotated, the beam 24 is directed generally axially along the multi-faceted mirror 40. This movement produces a plurality of scan lines 46 which are perpendicular to the line forming scan 44. The shaft 39 is placed at an angle that will compensate for the rotation of mirror 40. The split beam 24 is traced across the mirror 40 at an angle relative to the axis of shaft 42 so that the lines 46 will be parallel to one another and perpendicular to line 44, thereby producing the comb-like scan pattern shown in FIG. 2.

As is demonstrated in FIG. 1, in order to produce a given number $x$ of lines 46 (nine such lines being shown) for each longitudinally extending scan line 44, the mirror 38 must be rotated $x$ times before scan line 44 is traced once. More specifically, the multi-faceted mirror 40 would be partially rotated so that the beam 22 extends across one face of the multi-faceted mirror while the mirror 38 is being rotated $x$ times.

As an item bearing a label 49 crosses the window 14, it is detected by the detector 43 and this information is transmitted to the associated electronics system. For example, the detector 43 may be used to enable the scanning system 10 when an item enters the window 14 area. The detector 43 is located below the scan plan so as to view the same along the longitudinal scan line 44.

As an item having a label 49 is conveyed across the window 14, the bar codes 47 are intercepted by the comb-like scan pattern 44, 46 and the light reflected therefrom is directed to the photocell 45 which converts the incident light into electrical signals that are transmitted to the associated electronics system to be decoded, as is well-known in the art.

Figure 3:
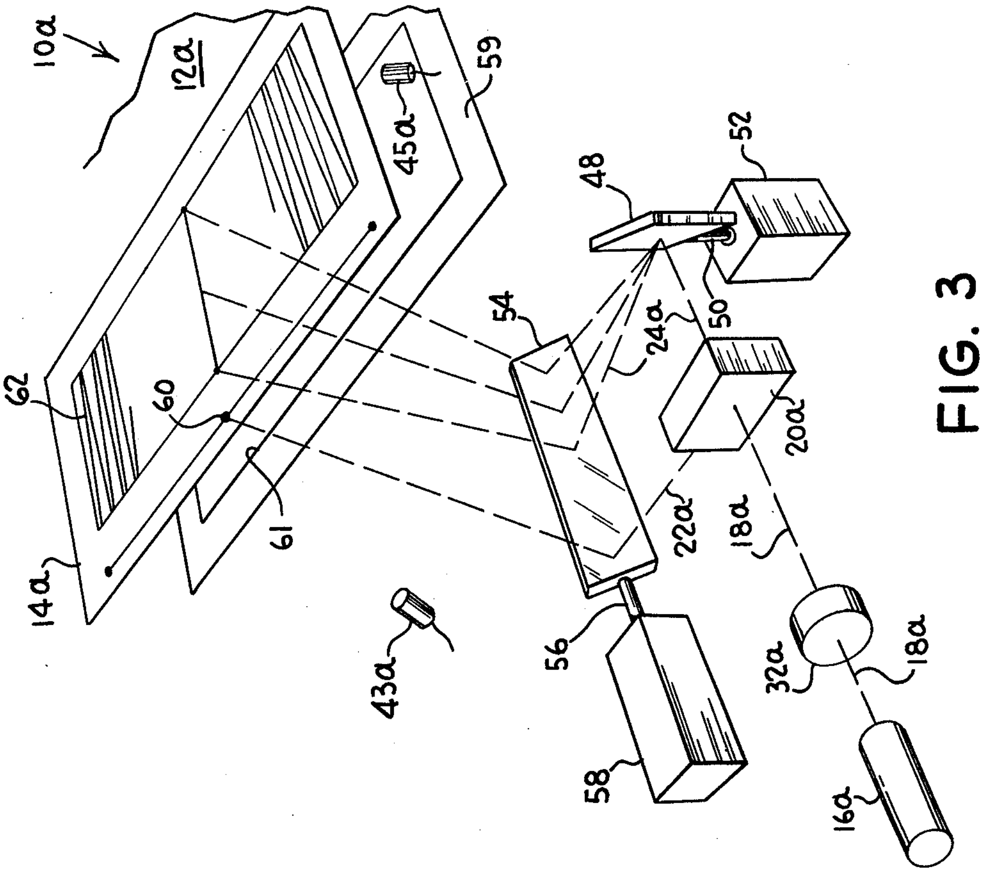
FIG. 3 is a perspective view of an apparatus which incorporates an alternate embodiment of this invention.
Figure 4:
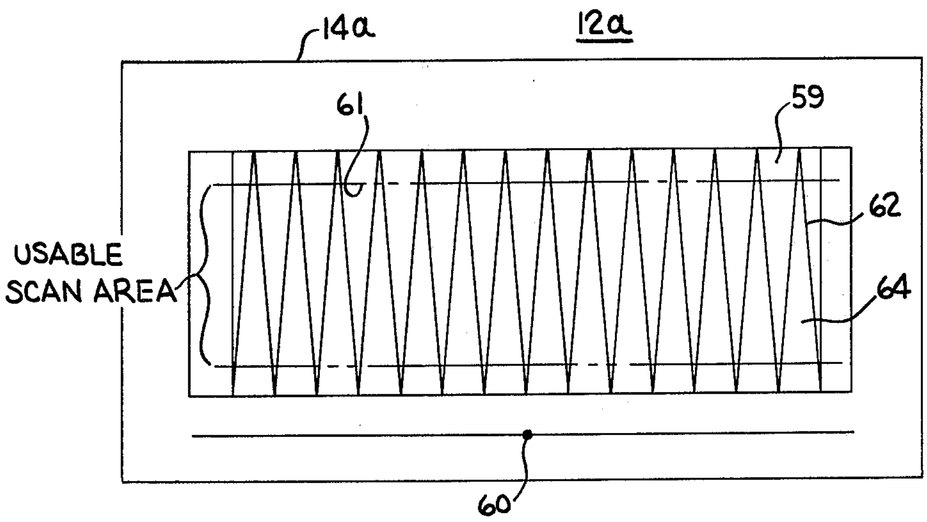
FIG. 4 is a plain view of the scan pattern produced by the apparatus of FIG. 3.

FIG. 3 shows an alternate embodiment of the invention wherein a scanning system 10*a* is used for producing the scan pattern shown in FIG. 4. Again, a laser 16*a* is used to produce a light beam 18*a*. This beam 18*a* travels through a spot forming lens 32*a* and subsequently strikes a beam splitter 20*a*. The beam splitter 20*a* splits the beam 18*a* into a first slit beam 22*a* and a second beam 24*a*. The second beam 24*a* is directed toward an oscillating mirror 48 which is secured to a shaft 50. The shaft 50 is operatively engaged with a minor scan mirror driver 52 which provides the oscillatory motion to the mirror 48. The first beam 22*a* is deflected by the beam splitter 20*a* and the second beam 24*a* is reflected from the oscillating mirrors 48 onto another oscillating mirror 54 which is attached to a shaft 56.

The shaft 56 in turn is operatively secured to a major scan mirror driver 58 which drives the shaft 56 in an oscillatory manner, in turn causing the mirror 54 to oscillate. The beam 22*a* is reflected from the oscillating mirror 54 to form a longitudinally extending line scan 60 upon the window 14*a*. The second beam 24*a* is directed axially along the oscillating mirror 54, and is reflected through an optical mask 59 toward the window 14 to traverse a sinusoidal curve. As is evident from FIG. 3, in order to produce a number $y$ of scan line 62 for each longitudinally extending line scan 60, the mirror 48 must be oscillated $y$ times for each oscillation of mirror 54. The optical mask 59 is a rectangular barrier member having a rectangular opening 61 therein which allows only a portion of the reflected beam 24*a* to pass toward the window 14*a*. With reference to FIG. 4, the entire line scan 62 is not viewed from the window 14 as the extreme portions from the sinusoidal curve is eliminated by the optical mask 59. That portion of the curve within opening 61 appears as a plurality of lines at angles of approximately 30° relative to the lateral direction of the window. This scan pattern has also been found to be efficient for the purpose of reading bar code bearing indicia and the balance of the components in the scanning system 10*a* perform the same functions as their counterpart components in the scanning-system 10.

What is claimed is:

1. In a method for producing a scan pattern on the window of a check-out stand for the reading of bar codes, the steps comprising:

A. directing a beam of light toward the window to produce a longitudinally extending scan across the window; and B. simultaneously directing a second beam of light toward the window to produce a plurality of scans on the window which are substantially at a right angle to the longitudinally extending scan.

2. In a method for producing a scan pattern for the reading of bar coded indicia which are conveyed across the window of a check-out stand, the steps comprising:

A. producing a pair of parallel beams of light;

B. directing said beams of light upon a multifaceted mirror which is disposed below the window of the check-out stand, which multifaceted mirror has an axis of rotation that is located generally parallel with the plane of the window;

C. rotating said mllti-faceted mirror about its axis; and,

D. scanning one of said light beams along the axis of said mirror such that each facet receives a plurality of scans.

3. In an omnidirectional scan pattern producing apparatus for the reading of digitally encoded indicia, the combination comprising:

A. means for generating a pair of light beams;

B. means for directing one of said light beams upon a first reflective surface;

C. means for directing the other said light beam upon a second reflective surface;

D. means for directing said light beams from said reflecting surfaces onto a many faceted reflective member;

E. means for rotating said many faceted reflective member; and

F. means for rotating said second reflective surface to deflect said other light beam across each facet a plurality of times.

4. In an apparatus for producing an omnidirectional scan pattern for the reading of a digitally encoded indicia that are conveyed past the window of a check-out stand, the combination comprising:

A. means for generating a pair of light beams;

B. a longitudinal first reflective member having a plurality of longitudinally extending reflective surfaces located below the window, the window being in the reflective path of said first reflective member;

C. second and third parallel reflective surfaces generally facing said first reflective member, said first reflective member surfaces being located in the reflective path of said second and third reflective surfaces;

D. means for directing a first of said light beams upon said second reflective surface;

E. means for rotating said second reflective surface about an axis which is parallel to the plane of said second reflective surface and perpendicular to the axis of said first reflective member to produce upon the reflective member a plurality of longitudinally extending scans by said first light beam;

F. means for directing the second of said light beams upon said third reflective surface;

G. means for rotating said first reflective member to produce a longitudinal scan by said first light beam as it is reflected to the window and to produce a plurality of scans by said second beam as it is reflected to the window which scans are at right angles to said longitudinal scan; and H. photocell means for receiving light reflected from an indicia on the window.

5. The apparatus of claim 4 wherein said means for generating a pair of light beams comprises a laser and a beam splitter spaced relative to said laser, said beam splitter being operative to transmit the beams to said directing means.

6. The apparatus of claim 5 wherein said directing means includes means for increasing the resolution and intensity of said light beams.

7. In an apparatus for producing an omnidirectional scan pattern for the reading of a bar coded indicia that are conveyed past the window of a check-out stand, the combination comprising:

A. means for generating a pair of light beams;

B. a longitudinal first reflective surface generally facing the window;

C. means for directing a first of said light beams upon said first reflective surface;

D. means for oscillating said first reflective surface about its longitudinal axis to produce at the window an elongated extending scan by said first light beam;

E. a second reflective surface spaced adjacent to said first reflective surface, said first reflective surface being located in the reflective path of said second reflective surface;

F. means for directing the second of said light beams upon said second reflective surface; and G. means for oscillating said second reflective surface to impart longitudinal motion to said second light beam as it is directed toward said first reflective surface.

8. The combination of claim 7 including a mask having an aperture therein disposed intermediate said first reflective surface and the window.

* * * * *